US008643375B2

(12) United States Patent
Thorvinger

(10) Patent No.: US 8,643,375 B2
(45) Date of Patent: Feb. 4, 2014

(54) CIRCUIT SYSTEM AND METHOD OF CONTROLLING POWER MANAGEMENT

(75) Inventor: Jens Thorvinger, Lund (SE)

(73) Assignee: ST-Ericsson SA, Plan-les-Ouates (CH)

( * ) Notice: Subject to any disclaimer, the term of this patent is extended or adjusted under 35 U.S.C. 154(b) by 259 days.

(21) Appl. No.: 13/139,920

(22) PCT Filed: Dec. 8, 2009

(86) PCT No.: PCT/EP2009/066649
§ 371 (c)(1),
(2), (4) Date: Nov. 16, 2011

(87) PCT Pub. No.: WO2010/069822
PCT Pub. Date: Jun. 24, 2010

(65) Prior Publication Data
US 2012/0319694 A1    Dec. 20, 2012

Related U.S. Application Data

(60) Provisional application No. 61/122,803, filed on Dec. 16, 2008.

(51) Int. Cl.
*G01N 27/416*    (2006.01)

(52) U.S. Cl.
USPC ........... 324/427; 324/416; 324/433; 713/323; 713/324; 713/300; 320/105; 320/107; 320/149

(58) Field of Classification Search
USPC .......... 324/427, 416, 433; 713/323–324, 300; 320/105, 107, 149
See application file for complete search history.

(56) References Cited

U.S. PATENT DOCUMENTS

| 4,316,185 | A | * | 2/1982 | Watrous et al. | 340/636.11 |
|---|---|---|---|---|---|
| 5,410,711 | A | * | 4/1995 | Stewart | 713/322 |
| 5,581,692 | A | * | 12/1996 | Nevitt et al. | 714/12 |
| 5,744,984 | A | * | 4/1998 | Drapac et al. | 327/89 |
| 6,081,140 | A | * | 6/2000 | King | 327/77 |
| 6,100,667 | A | * | 8/2000 | Mercer et al. | 320/137 |
| 7,383,449 | B2 | * | 6/2008 | Nokkonen | 713/300 |
| 7,667,534 | B2 | * | 2/2010 | Klein | 329/312 |
| 7,882,383 | B2 | * | 2/2011 | May et al. | 713/500 |
| 7,893,654 | B2 | * | 2/2011 | Huang | 320/107 |
| 7,990,108 | B2 | * | 8/2011 | Aas et al. | 320/134 |
| 8,479,023 | B2 | * | 7/2013 | Picard et al. | 713/300 |
| 2004/0046566 | A1 | * | 3/2004 | Klang | 324/429 |
| 2004/0095120 | A1 | * | 5/2004 | Kernahan | 323/282 |
| 2004/0113630 | A1 | * | 6/2004 | Sudou | 324/433 |
| 2004/0146313 | A1 | * | 7/2004 | Uchizono et al. | 399/75 |
| 2004/0193927 | A1 | * | 9/2004 | Volk | 713/300 |

(Continued)

*Primary Examiner* — Patrick J Assouad
*Assistant Examiner* — Lamarr Brown
(74) *Attorney, Agent, or Firm* — Coats & Bennett, P.L.L.C.

(57) ABSTRACT

A circuit system is disclosed. The system comprises a master circuitry, at least one slave circuitry which has a battery sensor for checking battery status of a power supply battery and a shut down mechanism for controlled shut down upon detection of low battery by the battery sensor, and a battery sensor manipulation circuit controlled by the master circuitry. The battery sensor manipulation circuit is arranged to manipulate sensed battery status for the battery sensor of at least one of the at least one slave circuitry to force the controlled shut down of the at least one of the at least one slave circuitry upon provision of a shut down control signal from the master circuitry. A method of controlling power management of such a circuit system is also disclosed.

12 Claims, 3 Drawing Sheets

(56) References Cited

U.S. PATENT DOCUMENTS

| | | | |
|---|---|---|---|
| 2004/0212941 A1* | 10/2004 | Haas et al. | 361/90 |
| 2004/0232889 A1* | 11/2004 | Sudo et al. | 320/149 |
| 2005/0017676 A1* | 1/2005 | Takimoto et al. | 320/107 |
| 2006/0026448 A1* | 2/2006 | Horii | 713/340 |
| 2006/0053322 A1* | 3/2006 | Wu | 713/300 |
| 2006/0279970 A1* | 12/2006 | Kernahan | 363/65 |
| 2008/0007211 A1* | 1/2008 | Poisner | 320/107 |
| 2008/0104433 A1* | 5/2008 | May et al. | 713/300 |
| 2008/0222437 A1* | 9/2008 | Sutardja et al. | 713/323 |
| 2008/0238357 A1* | 10/2008 | Bourilkov et al. | 320/106 |
| 2008/0276110 A1* | 11/2008 | Indiani et al. | 713/330 |
| 2009/0179669 A1* | 7/2009 | Bartley et al. | 326/82 |
| 2010/0049994 A1* | 2/2010 | Ghoshal | 713/300 |
| 2010/0064160 A1* | 3/2010 | Wilson et al. | 713/324 |
| 2010/0070788 A1* | 3/2010 | Nguyen | 713/323 |
| 2010/0123463 A1* | 5/2010 | Iwasaki | 324/433 |
| 2010/0149838 A1* | 6/2010 | Artusi et al. | 363/20 |
| 2010/0257391 A1* | 10/2010 | Dring et al. | 713/323 |
| 2010/0275041 A1* | 10/2010 | Zhou et al. | 713/300 |
| 2011/0197084 A1* | 8/2011 | Xi | 713/323 |
| 2012/0112686 A1* | 5/2012 | Zhang et al. | 320/107 |
| 2013/0113415 A1* | 5/2013 | Chen et al. | 320/107 |
| 2013/0227313 A1* | 8/2013 | Vorenkamp et al. | 713/300 |

* cited by examiner

CIRCUIT SYSTEM AND METHOD OF CONTROLLING POWER MANAGEMENT

TECHNICAL FIELD

The present invention relates to a circuit system, and a method of controlling power management of such a circuit system.

BACKGROUND

Several circuits, many times called platforms due to their complex implementation of functions into a complex electronic building block, can be integrated into a circuit system, such as an embedded system, powered by a battery. These platforms may normally be developed with the intention of being the only platform in an embedded system. Therefore a platform normally has a standalone Power Management Integrated Circuit, PMIC, powered directly from a battery and powering all parts of the platform and handling the start up and shut down sequence of the power levels of the platform.

When more than one platform is integrated into an embedded system there can be two or more PMICs, each one powering the parts of its platform.

The platforms may communicate with each other through a communication bus controlled by software. One of the platforms may act as a power master and thereby is the first to start up, then starting up the other platform(s) and finally ordering the other platform(s) to shut down through a communication bus.

The approach of managing power through the communication bus may cause one or more issues, depending on the reason for shutting down. If the shut down is due to low battery and the power master shuts down first due to local settings in that platform, the other platforms may be left in undesired states. If the shut down is for saving power, the communication bus approach can be slow and/or power consuming such that less power is saved, and in worst case, the bus approach will not work at all if the power master shuts down too fast such that there is no time for software operated to shut down via the bus at all. Other issues may also occur due to compatibility issues between the platforms. It is therefore an object to provide an approach for power management that is less sensitive to such effects.

SUMMARY

The inventor has found that when the platforms are developed with the intention of being the only platform in the embedded system, each platform in the embedded system may have a battery sensor which will shut down all the parts of the platform if the supply voltage of the battery drops below a predefined threshold. Since the platforms have independent sensors this might occur at different battery voltage levels.

The inventor has found that if a slave platform shuts down first there is usually no problem since the master will be able to hand le this situation with software. However if the master shuts down first, the software of the master will not be able to initiate a shut down command to the slave platform(s) and therefore the slave platform(s) will continue to be active, causing undesirable side effects.

The inventor has found that the master platform might also be shut down due to other reasons than low battery voltage, such as a hardware circuit forcing the platform to shut off if the user presses a forced shut down key or other hardware triggered events. Also in these cases the software of the master may not be able to initiate a shut down command to the slave platform(s) and therefore the slave platform(s) will continue to be active, causing undesirable side effects.

The invention is based on the above elucidated observations by the inventor, who got the idea to implement a low power hardware mechanism that will automatically manipulate a battery sensor of the slave platform(s) and cause the slave platform(s) to shut down right after the master platform has shut down. This is done by temporarily forcing the voltage to the battery sensor of the slave platform(s) to drop if an internal voltage of the master platform goes low. The inventor also has realized that this approach is usable for selectably controlling shut down of slave platform(s).

According to a first aspect, there is provided a circuit system comprising a master circuitry; at least one slave circuitry which has a battery sensor for checking battery status of a power supply battery and a shut down mechanism for controlled shut down upon detection of low battery by the battery sensor; and a battery sensor manipulation circuit controlled by the master circuitry. The battery sensor manipulation circuit is arranged to manipulate sensed battery status for the battery sensor of at least one of the at least one slave circuitry to force the controlled shut down of the at least one of the at least one slave circuitry upon provision of a shut down control signal from the master circuitry.

The battery sensor manipulation circuit may comprise a first resistor connected between the power supply battery and the battery sensor. The first resistor has a resistance that is lower than the impedance of the battery sensor. Here, the first resistor preferably is significantly lower than the impedance of the battery sensor, e.g. with a ratio of 1 to 100 or higher. The battery sensor manipulation circuit may have a first current valve connected between the battery sensor and a low voltage point such that the current valve pulls the voltage of the battery sensor low upon provision of a manipulation control signal based on the shut down control signal from the master circuitry. The low voltage point may be ground or a negative supply voltage. Alternatively, the battery sensor manipulation circuit may comprise a logical gate controlled by a manipulation control signal based on the shut down control signal from the master circuitry. The logical gate may be a NOT gate, i.e. a logical inverter circuit, or a level shifter.

The battery sensor manipulation circuit may further comprise a signal provision circuit comprising a second resistor and a second current valve connected in series between the supply battery and a low voltage point such that the second current valve pulls the voltage of the signal, provided between the second resistor and the second current valve, low upon provision of a high voltage from the master circuitry, and the signal is high upon provision of a low voltage from the master circuitry; and a signal high pass filter fed by the signal and outputting the manipulation control signal. The voltage provided by the master circuitry to the second current valve may be an internal voltage of the master circuitry. Thereby the slave circuitry is powered down when the master circuitry is powered down.

The shut down control signal from the master circuitry may control shut down of all of the at least one slave circuitry upon shut down of the master circuitry. Alternatively, the shut down control signal from the master circuitry may selectably control shut down of one or more of the at least one slave circuitry.

According to a second aspect, there is provided a method of controlling power management of a circuit system as of the first aspect. The method comprises manipulating battery status sensed by the battery sensor of at least one of the at least one slave circuitry to force the controlled shut down of the at least one of the at least one slave circuitry upon provision of a shut down control signal from the master circuitry.

The method may further comprise controlling shut down of all of the at least one slave circuitry upon shut down of the master circuitry by the shut down control signal from the master circuitry.

The method may further comprise selectably controlling shut down of one or more of the at least one slave circuitry by the shut down control signal from the master circuitry.

DETAILED DESCRIPTION

Figure 1:
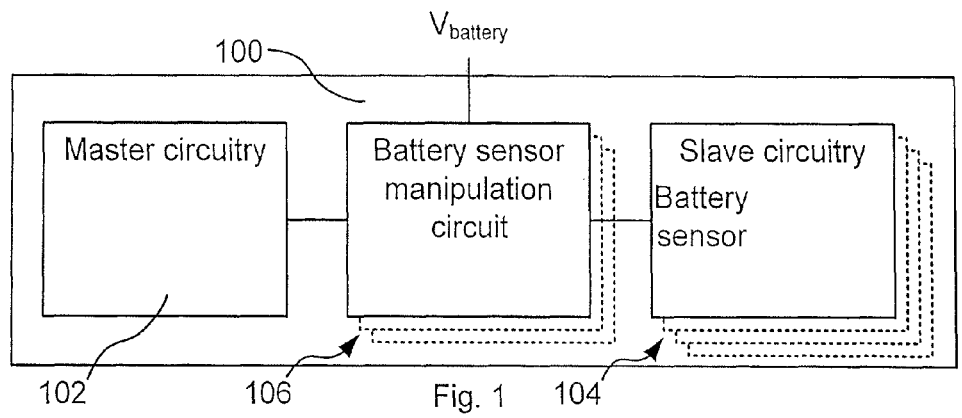
FIG. 1 is a block diagram schematically illustrating a circuit system according to an embodiment.

FIG. 1 is a block diagram schematically illustrating a circuit system 100 according to an embodiment. The circuit system 100 comprises a master circuitry 102 and one or more slave circuitry 104. For each slave circuitry 104, battery voltage is monitored by a battery voltage sensor. By manipulating the battery voltage sensor(s), under control of the master circuitry 102, the one or more slave circuitry 104 can be forced to perform shut down according to shut down schemes of respective slave circuitry 104. The battery voltage sensor(s) are therefore manipulated by one or more battery sensor manipulating circuits 106. The battery sensor manipulating circuit(s) 106 is (are) connected to the master circuitry 102 to receive a control signal for shut down. The control signal can be a dedicated control signal, such that one or more slave circuitry 104 can be selectably shut down, or be an internal voltage of the master circuitry 102 such that the slave circuitry 104 shut down when the master circuitry 102 does so. With high impedance of the battery sensor input, the battery can be monitored via the battery sensor manipulation circuitry 106. When no shut down control signal is provided, the battery status is controlled by the battery sensor(s) and the slave circuitry 104 shuts down upon low battery voltage. When a shut down control signal is provided, the slave circuitry 104 will experience a low battery voltage, although the battery voltage may be sufficient, and will perform shut down.

In the following, the term "platform" is occasionally used as an equivalent to the term "circuitry" used above in sense of the complex electronic building blocks.

Figure 2:
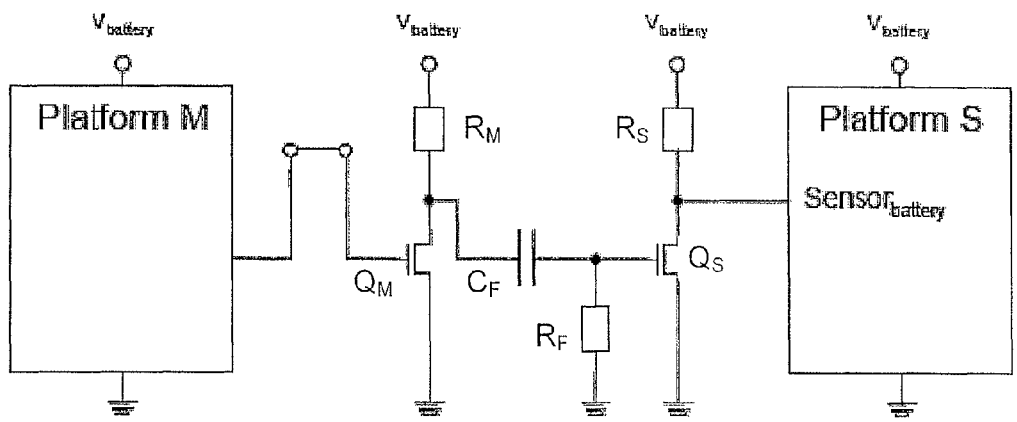
FIG. 2 schematically illustrates a master circuitry, a slave circuitry, and battery sensor manipulation circuit according to an embodiment.

FIG. 2 schematically illustrates a master circuitry, a slave circuitry, and battery sensor manipulation circuit according to an embodiment. Battery voltage is monitored by a battery voltage sensor of the slave platform(s) Platform S. With high impedance of the battery sensor input, the battery can be monitored via a resistor $R_S$ between the battery and the sensor, where the resistor $R_S$ has a resistance much lower than the impedance of the battery sensor. In case of sudden shut down of the master platform Platform M, the battery voltage sensor of the slave platform(s) Platform S can be pulled low by a current valve, e.g. a transistor, $Q_S$.

In order to avoid power leakage from the battery voltage $V_{battery}$ to ground through resistors in off mode, the current valve $Q_S$ can be arranged to only temporarily conduct due to a signal high pass filter $R_F$ and $C_F$. The signal into the high pass filter can be an internal voltage $V_{DDM}$ of the master platform Platform M inverted with a resistor $R_M$ and a current valve, e.g. a transistor, $Q_M$, such that slave platform(s) is (are) shut down when the master platform is shut down, as is further demonstrated below with reference to FIG. 4. Alternatively, the signal into the high pass filter can be a control signal provided by the master platform Platform M, possibly inverted or buffered with a resistor $R_M$ and a current valve, e.g. a transistor, $Q_M$, such that slave platform(s) is (are) shut down selectably by the master platform.

Examples of magnitudes of values of components are demonstrated in Table 1.

TABLE 1

Exemplary magnitudes of component values according to an embodiment

| | |
|---|---|
| $R_M$ | ~100 kΩ |
| $R_F$ | ~1 MΩ |
| $C_F$ | ~1 µF |
| $R_S$ | ~1 kΩ |

Figure 3:
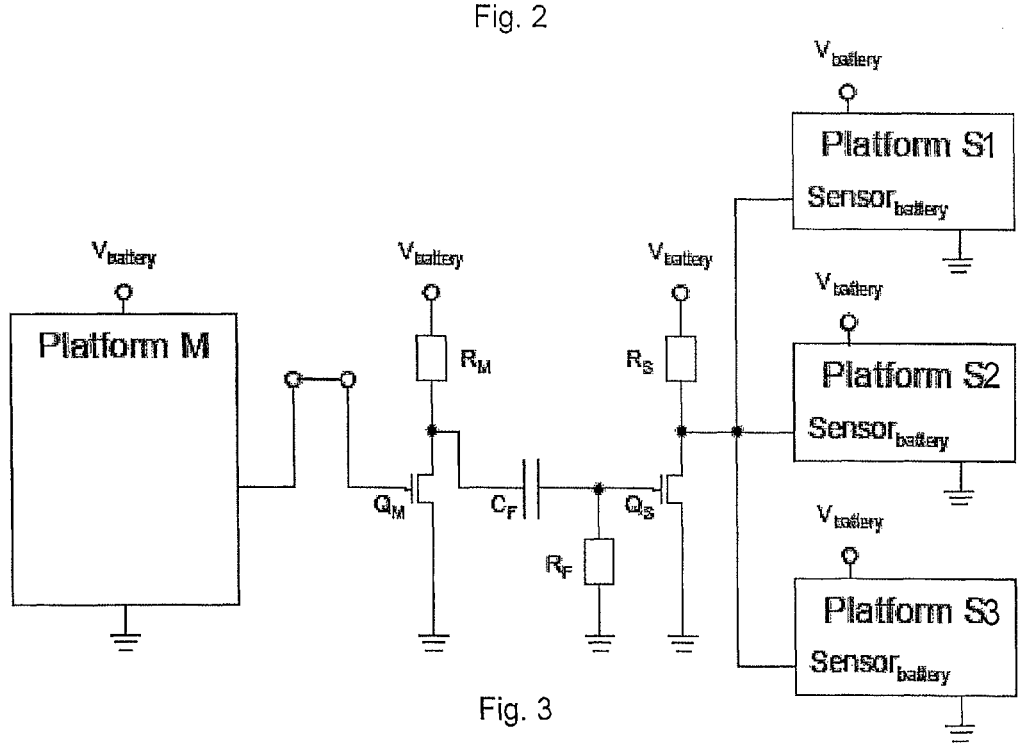
FIG. 3 schematically illustrates a master circuitry, some slave circuitry, and battery sensor manipulation circuit according to an embodiment.

FIG. 3 schematically illustrates a master circuitry Platform M, some slave circuitry Platform S1, Platform S2, Platform S3, and battery sensor manipulation circuit according to an embodiment. Here, the same battery sensor manipulation circuit is used for several slave platforms Platform S1, Platform S2, Platform S3. The function is similar to what is demonstrated with reference to FIG. 2.

Figure 4:
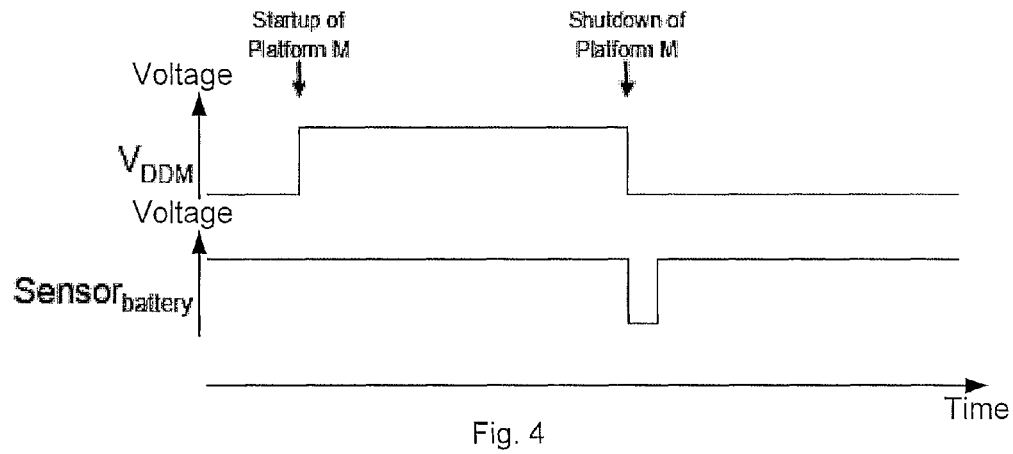
FIG. 4 schematically illustrates a timing diagram for shut down of slave circuitry based on power down of master circuitry according to an embodiment.

FIG. 4 schematically illustrates a timing diagram for shut down of slave circuitry based on power down of master circuitry according to an embodiment. The upper graph illustrates internal voltage $V_{DDM}$ of the master platform, and the lower graph illustrates the received signal of the sensed battery voltage of the slave platform. The dip in the sensed voltage will thus initiate shut down of the slave platform. The idea is thus to keep the voltage of the battery sensor of the slave platform(s) at battery voltage, except when the master platform shuts down its voltages. With reference to FIGS. 2 and 3, the components $R_M$, $C_F$ and $C_F$ are preferably selected in such a way that current valve $Q_S$ is conducting for such a long time that the battery sensor of the slave platform(s) is (are) able to detect the low voltage such that the slave platform(s) initiate its (their) normal shut down sequence. In case of a provided control signal from the master platform, this can be inherent by the properties of the control signal.

The current valve $Q_S$ is preferably chosen in such a way that it can handle a negative voltage on the gate that may occur at the startup of the master platform. This can for example be done by selecting a transistor $Q_S$ that can handle the negative voltage, or select a transistor $Q_S$ with built in diodes that will conduct and cause any negative voltage not to occur, or use external diodes that will conduct and cause any negative voltage not to occur.

The designs demonstrated with reference to FIGS. 2 and 3 above which consist of an inverter $R_M$, $Q_M$, a high pass filter $C_F$, $R_F$ and one more inverter $R_S$, $Q_S$ have been found to be particularly advantageous due to low complexity, low power consumption and reliability. Some parts can be replaced with logical gates instead, as will be demonstrated with reference to FIGS. 5 to 7 below, but may result in higher cost and/or power consumption.

Figure 5:
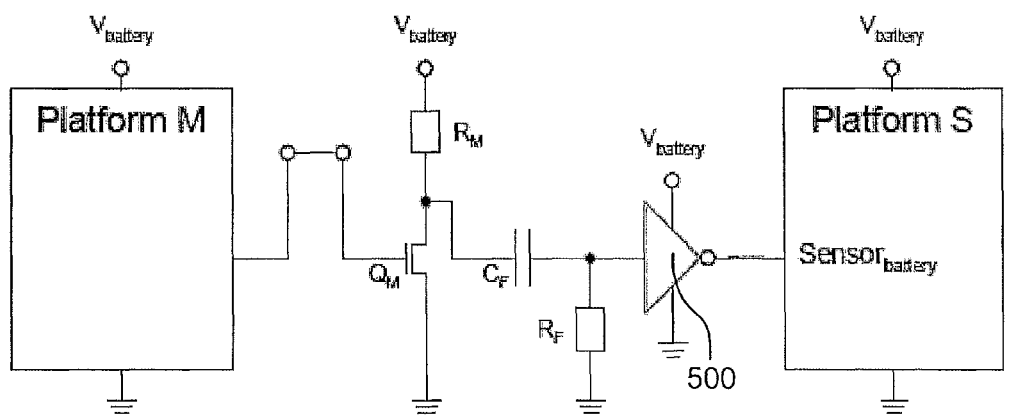
FIG. 5 schematically illustrates a master circuitry, a slave circuitry, and battery sensor manipulation circuit according to an embodiment.

FIG. 5 schematically illustrates a master circuitry, a slave circuitry, and battery sensor manipulation circuit according to an embodiment. In comparison with the battery sensor manipulation circuit demonstrated with reference to FIG. 2, the inverter arrangement with the resistor $R_S$ and the current valve $Q_S$ is replaced by a logical gate 500, for example a NOT gate.

Figure 6:
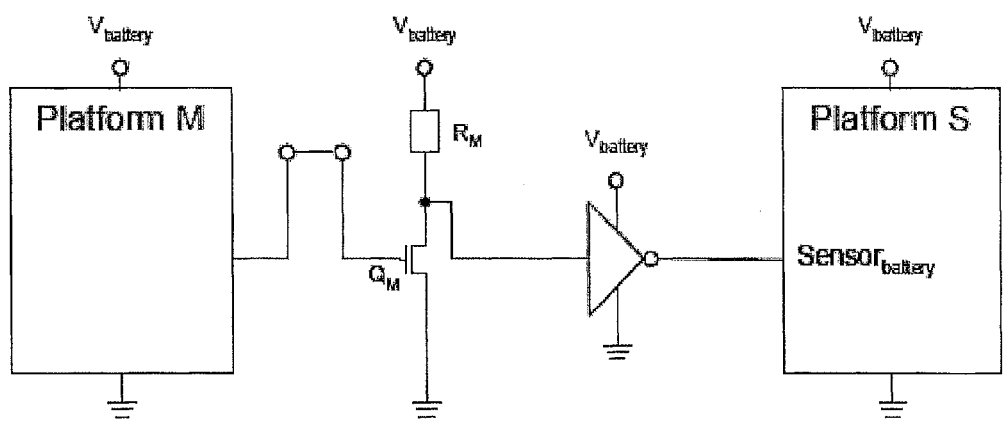
FIG. 6 schematically illustrates a master circuitry, a slave circuitry, and battery sensor manipulation circuit according to an embodiment.

FIG. 6 schematically illustrates a master circuitry, a slave circuitry, and battery sensor manipulation circuit according to an embodiment. In comparison with the battery sensor manipulation circuit demonstrated with reference to FIG. 5, the signal high pass filter $R_F$ and $C_F$ has been omitted. This is possible if the slave platform Platform S can accept a constant low battery sensor.

Figure 7:
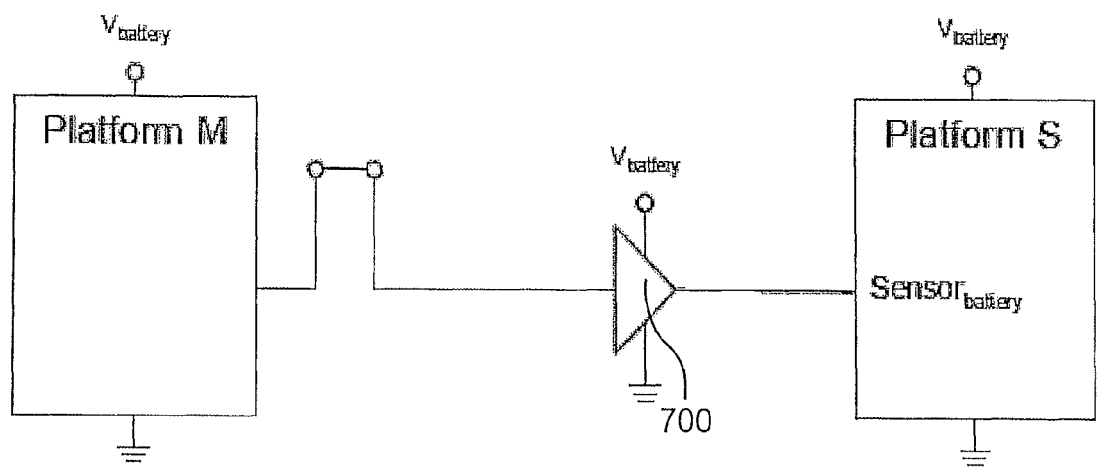
FIG. 7 schematically illustrates a master circuitry, a slave circuitry, and battery sensor manipulation circuit according to an embodiment.

FIG. 7 schematically illustrates a master circuitry, a slave circuitry, and battery sensor manipulation circuit according to an embodiment. In comparison with the battery sensor manipulation circuit demonstrated with reference to FIG. 2, the inverter $R_M$, $Q_M$, a high pass filter $C_F$, $R_F$ and one more inverter $R_S$, $Q_S$ have been replaced by a logical gate, here a level shifter 700. Here, current consumption of the level shifter 700 and the issue whether the level shifter 700 accepts a power supply from the battery voltage when platforms are shut down need to be considered.

The advantages of the disclosed approach can be several. As mentioned in the introduction, using the communication bus to shut down the slave platform(s) will only work during normal conditions. In the case of a sudden shutdown of the master platform the slave platform(s) will continue to be on.

The advantage of manipulating the battery voltage sensor of the slave platform(s) in accordance with embodiments of the invention is that the slave platform(s) will function in the same way as it (they) were initially designed for. The invention just adds a new functionality without causing side effects to existing functionality of the platform(s).

The advantage of adding the signal high pass filter $R_F$ and $C_F$ in accordance with further embodiments of the invention is that the sensor will just drop temporarily enabling the invention to use a low value of resistor $R_S$, preferably with significantly lower than the input impedance of the battery sensor, which will affect the battery measurement insignificantly. At the same time a base line current consumption in off mode will only be any potential leakage through the current valves $Q_S$ and $Q_M$ since there is no voltage drop over any resistor.

The advantage of manipulating the battery sensor of the slave platform(s) is that no large power transistors are needed since the no power supplies are cut. Only low cost, small size transistors and passive components are needed. It is thus possible to avoid cutting the power to the slave platform(s) using a power transistor between the battery and the entire slave platform(s) and control the power transistor using an internal voltage of the master platform. This would have cost the PCB area of a larger power transistor and a voltage drop over the power transistor when the slave platform(s) has a high current consumption.

The invention claimed is:

1. A circuit system comprising:
   a master circuitry;
   at least one slave circuitry which has a battery sensor, having an input, for checking battery status of a power supply battery and a shut down mechanism for controlled shut down upon detection of low battery by the battery sensor; and
   a battery sensor manipulation circuit controlled by the master circuitry, the battery sensor manipulation circuit being arranged to manipulate sensed battery status for the battery sensor of at least one of the at least one slave circuitry to force the controlled shut-down of the at least one of the at least one slave circuitry upon provision of a shut-down control signal from the master circuitry.

2. The circuit system of claim 1 wherein the battery sensor manipulation circuit comprises a battery sensor driver circuit comprising:
   a first resistor (Rs) connected between the power supply battery and the battery sensor input, wherein the first resistor (Rs) has a resistance that is lower than the impedance of the battery sensor; and
   a first current valve (Qs) connected between the battery sensor input and a low voltage point such that the current valve pulls the voltage of the battery sensor low upon provision of a manipulation control signal based on the shut-down control signal from the master circuitry.

3. The circuit system according to claim 1 wherein the battery sensor manipulation circuit comprises battery sensor driver circuit comprising a logical gate controlled by a manipulation control signal based on the shut-down control signal from the master circuitry.

4. The circuit system according to claim 3 wherein the logical gate comprises one of a NOT gate and a level shifter.

5. The circuit system according to claim 2 wherein the battery sensor manipulation circuit further comprises a signal provision circuit comprising:
   a second resistor (Rm); and
   a second current valve (Qm);
   wherein the second resistor (Rm) and second current valve (Qm) are connected in series between the supply battery and a low voltage point such that the second current valve (Qm) is operative to cause the battery sensor driver circuit to output a low voltage upon provision of a high voltage from the master circuitry, and to output a high voltage upon provision of a low voltage from the master circuitry.

6. The circuit system according to claim 5 wherein the battery sensor manipulation circuit further comprises a signal high pass filter (Rf, Cf) interposed between the signal provision circuit and the battery sensor driver circuit.

7. The circuit system according to claim 5, wherein the voltage provided by the master circuitry to the second current valve (Qm) is an internal voltage of the master circuitry.

8. The circuit system according to claim 1 wherein the shut-down control signal from the master circuitry is operative to shut down of all of the at least one slave circuitry upon shut-down of the master circuitry.

9. The circuit system according to claim 1 wherein the shut-down control signal from the master circuitry is operative to selectively shut down of one or more of the at least one slave circuitry.

10. A method of controlling power management of a circuit system comprising a master circuitry, at least one slave circuitry which has a battery sensor for checking battery status of a power supply battery and a shut-down mechanism for controlled shut-down upon detection of low battery by the battery sensor, and a battery sensor manipulation circuit controlled by the master circuitry, the method comprising:
   manipulating battery status sensed by the battery sensor of at least one of the at least one slave circuitry to force the controlled shut-down of the at least one of the at least one slave circuitry upon provision of a shut-down control signal from the master circuitry.

11. The method according to claim 10, further comprising controlling shut-down of all of the at least one slave circuitry upon shut-down of the master circuitry by the shut-down control signal from the master circuitry.

12. The method according to claim 10, further comprising selectively controlling shut-down of one or more of the at least one slave circuitry by the shut-down control signal from the master circuitry.

* * * * *